United States Patent [19]
Beckh

[11] Patent Number: 5,429,555
[45] Date of Patent: Jul. 4, 1995

[54] ENDLESS FLAT BAND AND PROCESS FOR PRODUCING IT

[75] Inventor: Gerhard Beckh, Herbrechtingen, Germany

[73] Assignee: Max Schlatterer GmbH & Co. KG, Herbrechtingen, Germany

[21] Appl. No.: 250,380

[22] Filed: May 27, 1994

[30] Foreign Application Priority Data

May 27, 1993 [DE] Germany .................. 43 17 652.6

[51] Int. Cl.$^6$ ............................................ F16G 1/00
[52] U.S. Cl. .................................... 474/267; 66/170; 112/63
[58] Field of Search ........................ 474/266–268; 112/63, 262.2; 156/244.11, 244.12; 66/169 R, 170, 190; 428/373, 374

[56] References Cited

U.S. PATENT DOCUMENTS 5,060,587 10/1991 Biesinger .................. 112/63

FOREIGN PATENT DOCUMENTS 88324 5/1894 Germany .
1284734 5/1963 Germany .

*Primary Examiner*—Michael Powell Buiz
*Attorney, Agent, or Firm*—Spensley Horn Jubas & Lubitz

[57] ABSTRACT

An endless flat band has a spirally placed, straight pulling element in the form of a thread or a wire extending in the direction of movement. A transverse connection is generated by loops and at least partially by a binding agent, wherein at least one spiral of the pulling element is inserted into a tubular fabric in the knitting machine. Because the spiral is inserted already straightened into a right/right transfer construction between loops or loops and tuck loops, it is achieved that a symmetrical fabric is made which increases the service life of the flat band and improves the useful properties.

12 Claims, 10 Drawing Sheets

ENDLESS FLAT BAND AND PROCESS FOR PRODUCING IT

FIELD OF THE INVENTION

The present invention relates to an endless flat band for use as a transmission belt, for example as a conveyor belt or the like, containing a spirally extending, straight pulling element in the form of a thread or a wire extending in the direction of movement of the band and having a transverse connection by means of loops and at least partially by means of a binding agent, wherein at least one spiral of the pulling element is inserted into a tubular fabric in a knitting machine.

The invention further relates to a process for producing such an endless flat band.

BACKGROUND OF THE INVENTION

A manufacturing process for an endless transmission belt on a flat bed knitting machine is described in German Patent DE-PS 12 84 734. Transmission and conveyor belts manufactured in this way cannot be used optimally everywhere, because the thread position of the weft thread, for example, unavoidably has a certain amount of waviness by reason of the insertion, necessary for production, of the weft thread in the form of a tuck loop. Because of this wave-shaped thread insertion the final belt length can be determined only empirically and cannot be exactly predetermined during production. For this reason it is necessary to prepare samples at the start of a production run in order to determine the exact belt length.

Another disadvantage of this fabric is its asymmetric structure. Because the fabric is produced as tubular goods, there always is a single-faced right/left knitting construction with side-by-side wales. These wales cause formation of ribs, especially with coarse fabrics made to an E8 or E6 gauge, i.e. six to eight needles/inch for heavy transmission belts, which result in development of considerable running noises when the belt is used at high speeds.

Because of the insertion of the weft thread in a tuck loop and the wave-shaped deformation of the thread caused thereby, it is difficult to maintain the thread insertion exactly the same across the fabric width as well as the thread insertion between the front needle bed and the rear needle bed. These different thread insertions cause differences in tension within the finished belt, which result in a considerable impairment of the straight running of the belt. But even the introduction of a double thread can only be done with great effort and with a loss of the quality of the finished endless belt. Multiple thread crossings are caused by the uncontrolled insertion of the double thread, which results in an erratic mesh pattern and, in particular, in differences in tension within the individual threads. This is particularly critical if it is intended to process materials of different yarn twists together in a known manner, for example left-hand twisted "S" and right-hand twisted "Z", to improve the straight running of the endless belt.

It is known that the yarn twist of a thread affects an endless belt in such a way that, when it runs over two parallel cylindrical disks it always runs in the respective direction of twist of the carrier thread. For this reason it is known to insert two threads in parallel. However, when employing two threads with S-twist and Z-twist, the insertion becomes uncontrolled in the normal right/left knitting construction with thread couliering and, as a result, there is frequent ride-over or twisting of the two threads. This naturally leads to an irregular final appearance of the goods and to thickening at the ride-over points.

Figure 1:
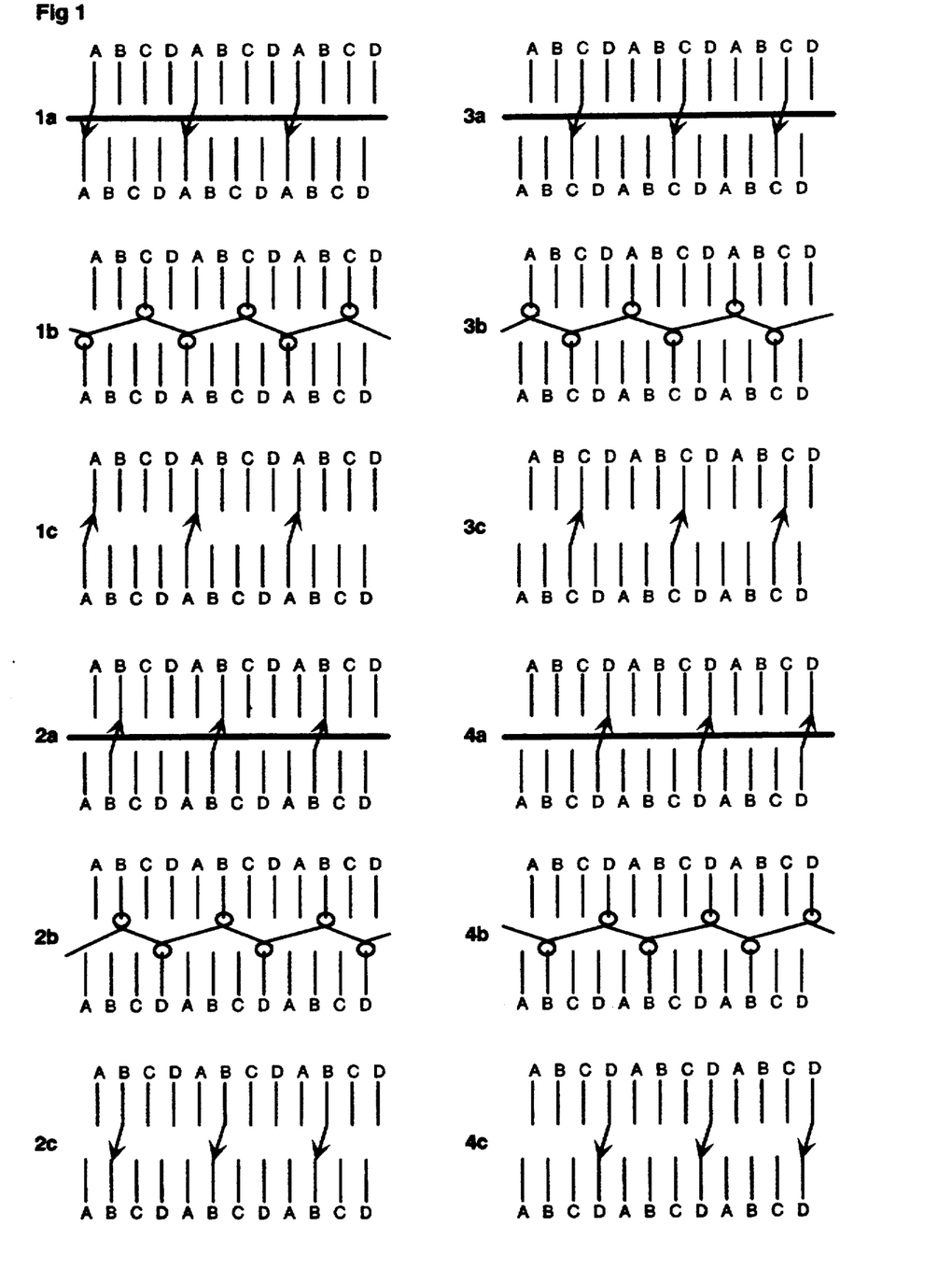
FIG. 1 is a thread progress diagram of a transfer weft knitting construction with loops only.
Figure 2:
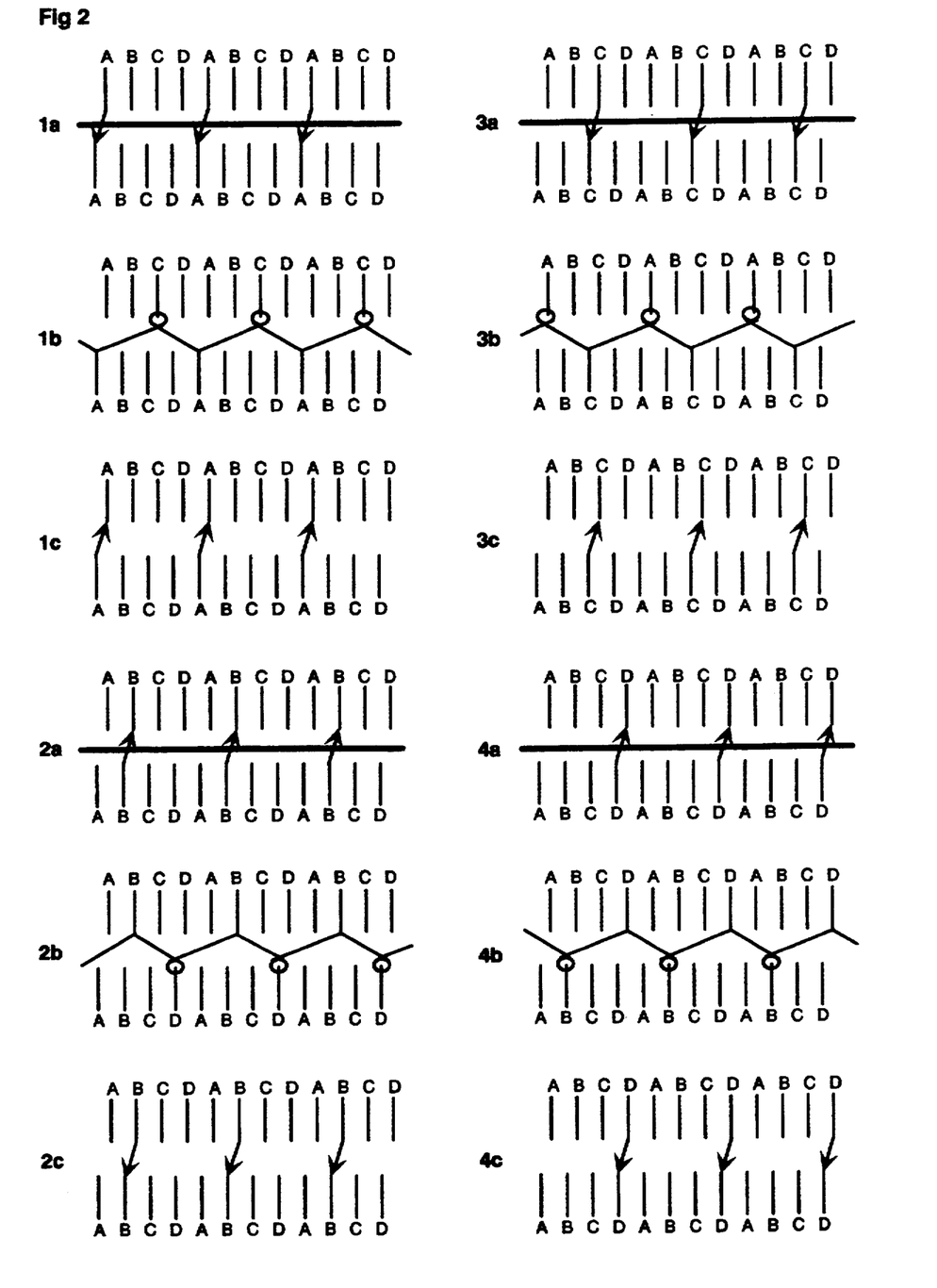
FIG. 2 is a thread progress diagram with alternating loops and tuck loops.

It is known from German Patent DE-PS 88 324 to produce a right/right tubular fabric with weft threads on a flat bed knitting machine (FIGS. 1, 2). However, auxiliary needles and narrowing combs are needed for freeing a path for the weft thread. Since there is no needle division and all needles $C_1$ always operate, it is necessary to transfer the loops of the auxiliary needles laterally to the needles $C_1$.

It is further known to those skilled in the art that it is impossible to produce a symmetrical tubular fabric on a conventional flat bed knitting machine.

To produce a useful fabric and to achieve a somewhat efficient production, the machine should be equipped with electronic needle selection and at least three knitting systems connected one behind the other.

SUMMARY OF THE INVENTION

Taking account of the above prior art, it is an object of the invention to provide improved endless flat bands, as well as a process for their production, of the type mentioned at the outset.

A more specific object of the invention is to provide a symmetrical fabric which can form a flat band having an increased service life.

In connection with the endless flat band, this object is attained by means of an endless flat band for use as a transmission belt which has a direction of movement, said band comprising: a spirally placed, straight pulling element in the form of a thread or a wire extending in the direction of movement of the belt: and a transverse connection composed of a tubular fabric which has thread loops and at least partially of a binding agent, wherein at least one turn of the pulling element is inserted into the tubular fabric in a knitting machine, wherein the at least one turn of said pulling element is inserted already straightened into a right/right transfer construction between loops or loops and tuck loops.

Objects according to the invention are further achieved by a process for manufacturing the endless flat band described above in a knitting machine having divided needles: comprising knitting the tubular fabric on the divided needles, inserting the pulling element as a weft thread during knitting, and transferring loop threads back to a binding needle.

In the process, defined needles or groups of needles of the front and rear needle bed are covered with loops in such a way that the selected needles always cooperate by means of the transfer technique with the opposite needles located on the other side, so that a typical knit pattern repeat would consist of the following steps:

1. divide the needles;
2. Knit;
3. Insert the weft and transfer the divided loops.

A symmetrical fabric is obtained by means of this knitting process, which makes it possible to employ a great variation of different weft thread thicknesses without problems.

The pulling element can be freely inserted and does not have to be couliered by means of the needles. The final belt length (circumference of the thread spiral) can also be exactly predetermined and no longer needs to be determined empirically. Length differences are avoided in that the carrier element (weft thread) can be inserted with an exactly defined tension.

The symmetrical loop formation is another advantage in comparison to the endless knitted tubes for flat belts known up to now. A tension equalization is created because of a quasi right/right loop formation achieved by means of the transfer knitting, preventing the increased tension on the loop side which would lead to excessive curling at the fabric edge and otherwise occurs in connection with one-sided, asymmetric right-/left knitting constructions. This results in an important advantage in the further processing of the fabric tube, because the additional smoothing of the knitted edges is omitted or a stiffening of the knitted edge is no longer necessary.

In addition, with an embodiment in which the pulling element comprises at least one thread twisted in the S-direction and at least one thread twisted in the Z-direction, the threads extending parallel to, and lying adjacent, one another in the fabric, it is possible to insert two threads in parallel. When working with two threads, the threads preferably have an S-twist and a Z-twist in alternation.

In the process it is possible to insert the two thread guide elements or thread guides in such a way that there is almost no thread ride-over at all. Another possibility of designing the thread insert in an even more precise manner is to employ separately controlled thread guides for the thread with the S-twist and the thread with the Z-twist.

With an embodiment in which the pulling element has at least one temperature-resistant thread and a least one plastic thread with a low melting point, it is possible to combine different materials. An example of this is a combination of a Kevlar TM carrier thread and a fusible polyamide thread. In this case, pre-bonding of the fabric is achieved, for example in a subsequent process, by fusing the fusible thread.

In a further embodiment, the pulling element has a highly elastic thread which has an elasticity or elongation greater than 20% after the tubular fabric is finished and the thread loops preferably consist of a material having a lower degree of elasticity than the elastic thread of the pulling element. In this case, the transfer knitting construction makes it possible to produce an endless flat band which has very great elasticity in a defined area which, however, is definitely limited. This is achieved in that the pulling element (weft thread) has a highly-elastic rubber or spandex thread or a thread made of other highly elastic materials, which preferably is covered with thread and has an elongation at tear greater than 100%, and an inelastic loop thread with an elongation at tear of maximally 25%. In the course of the stretching of the pulling element, the loop geometry of the knitted net also changes, and the tube or the flat band made from it experiences a natural elongation limitation when the loop geometry has changed sufficiently so that the shank of the loop of the needle loop completely rests against the carrier thread and the shank of the sinker loop has been elongated up to its end position. The elongation limitation can be changed by changing the couliering of the loop. In this case, longer loop shanks result in increased elongation.

Further advantages will be described below. The invention will be described in detail below by reference to schematic process progressions shown in FIGS. 1 to 7.

DESCRIPTION OF THE PREFERRED EMBODIMENTS

An endless flat band or knitted tube in the described transfer knitting construction is preferably produced on an electronically-controlled single- or multiple-system flat bed knitting machine. The computer-controlled regulation of the knitting systems of the needle guides and the needle selection permits a plurality of knitting construction variations which, however, are all based on the basic principle of knitting on divided needles, insertion of the weft thread and transfer of the loop shank to the construction needle. This includes an absolutely tension-free feeding of the weft thread. This is achieved by means of thread feeding devices, so-called feed-wheel mechanisms, which are particularly adapted to this knitting process.

To achieve even more accurate thread tension, it is possible to employ electronic servo motors which drive a feed-wheel mechanism and are con,rolled by an electronic thread tension measuring unit. The exact control of the thread tension of the weft thread is of decisive importance for high quality of the tubular fabric.

The described knitting construction forms the basis of many variation options, which can be changed by means of a different needle spacing, or division, or needle selection and changes in the knitting construction in the knitting rows. The knitting construction can be especially varied in that a plurality of rows of loops of different construction and needle selections are knitted in the form of intermediate rows between the weft insert.

FIG. 1 is a thread progress diagram of a transfer knitting construction with only loops. With the construction shown here, a pattern repeat of four needles to be selected is necessary, which needles are designated by A, B, C, D for, respectively, front and rear needle beds. Only the cooperation between the needles in the front and rear needle beds leads to the knitting construction shown in FIG. 1. The needles A and C in the rear needle bed or the needles B and D in the front needle bed are respectively covered by loops and represent the initial situation for the construction shown. A finished knitted row is formed by the operations depicted in function blocks consisting of diagram sections 1 to 4, wherein each section illustrates three operations a, b and c. These operations are the following:

a: Dividing of the selected needles by means of transfer and applying a weft thread (carrier thread) to the loops spread over the two needle beds, b: Knitting by means of the selected needles—loop only, c: Transferring the divided loops back to the initial needles in the rear needle bed.

Diagram section 2 basically shows the same operation, except that the initial knitting row is in the front needle bed and the needles are selectively divided in the rear needle bed.

Diagram section 3 shows the same operation as diagram section 1. In place of the loop on the needle A, the loop of the needle C is transferred to the selected needle C in the front needle bed.

Diagram section 4 is the same as diagram section 2, but again the loop on the needle D, instead of the loop on the needle B, is transferred to the selected needle D in the rear needle bed. The progression of knitting of the diagram sections 1 to 4 forms a complete knitting construction in which the result is a respective alternation of left and right loops, by means of which a relatively solid fabric is formed. In principle, the construction can also be made only by operations depicted in the diagram sections 1 and 2.

FIG. 2 differs from FIG. 1 in that the construction is made of loops and tuck loops which are formed in alternation. In this construction variant, a finished knitted row always requires the steps depicted in the four diagram sections shown.

The following operations are shown in diagram sections 1a, 1b and 1c:

1a. Selection of each fourth needle, indicated by A in diagram section 1,
   transfer of this loop to the opposite needle A and application of the weft thread (carrier thread).

1b. Selected needles knit loops in the rear needle bed and tuck loops in the front needle bed.

1c. Transfer of the divided loops from the front needle bed to the initial needle in the rear needle bed.

Diagram section 2 shows the same operation, only here the loops in the front needle bed are transferred to the rear on the selected counter-needle. Diagram sections 3 and 4 represent the oppositely offset function selection.

Figure 3:
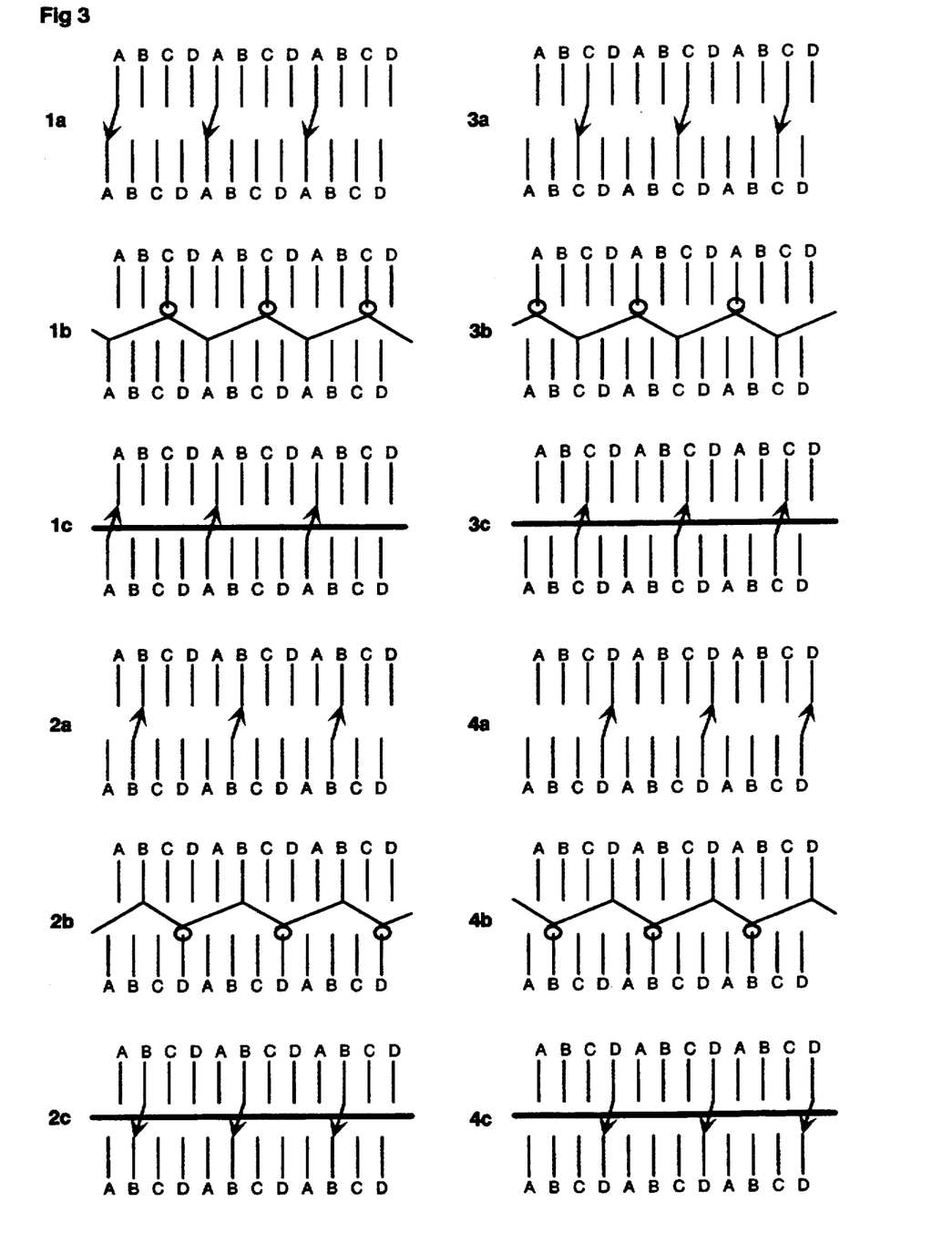
FIG. 3 is a thread progress diagram with loops and tuck loops, wherein a guide bar has been additionally pre-manufactured by working in a wave.

Twelve diagram sections are illustrated in FIG. 3, wherein the diagram sections 1 to 4 are the same as diagram sections 1 to 4 of FIG. 2. However, by means of inserting a wave, an additional guide bar is premanufactured for the belt or conveyor belt which is to be made from it later. The rear loops of the wave are prepared by the functions shown in diagram sections 5 and 6. The wave is formed by the functions shown in diagram sections 7 and 8, which are usefully repeated several times. The wave is knitted by the functions shown in diagram sections 9 to 12, and the needles for further knitting in transfer tuck loop construction are prepared as shown in diagram section 1 to 4.

Figure 4:
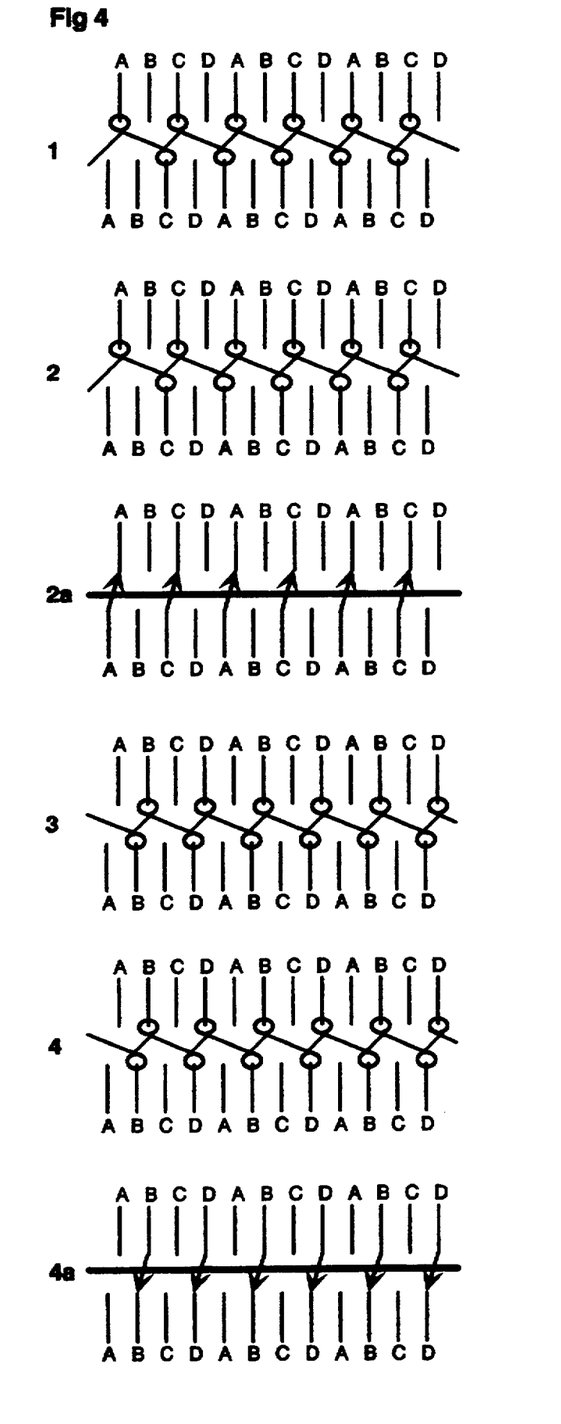
FIG. 4 is a thread progress diagram with loops only.

FIG. 4 illustrates a further construction variant, wherein diagram sections 1 and 2 illustrate operations in which the selected needles are covered by two rows of loops formed from two successive threads and diagram section 2a shows an operation in which a weft thread (carrier thread) is inserted, and the needles in the front needle bed or the rear needle bed covered by loops are transferred to the corresponding counter-needle. Diagram sections 3, 4 and 4a show succeeding operations which are symmetrical with those of diagram sections 1, 2 and 2a.

Figure 5:
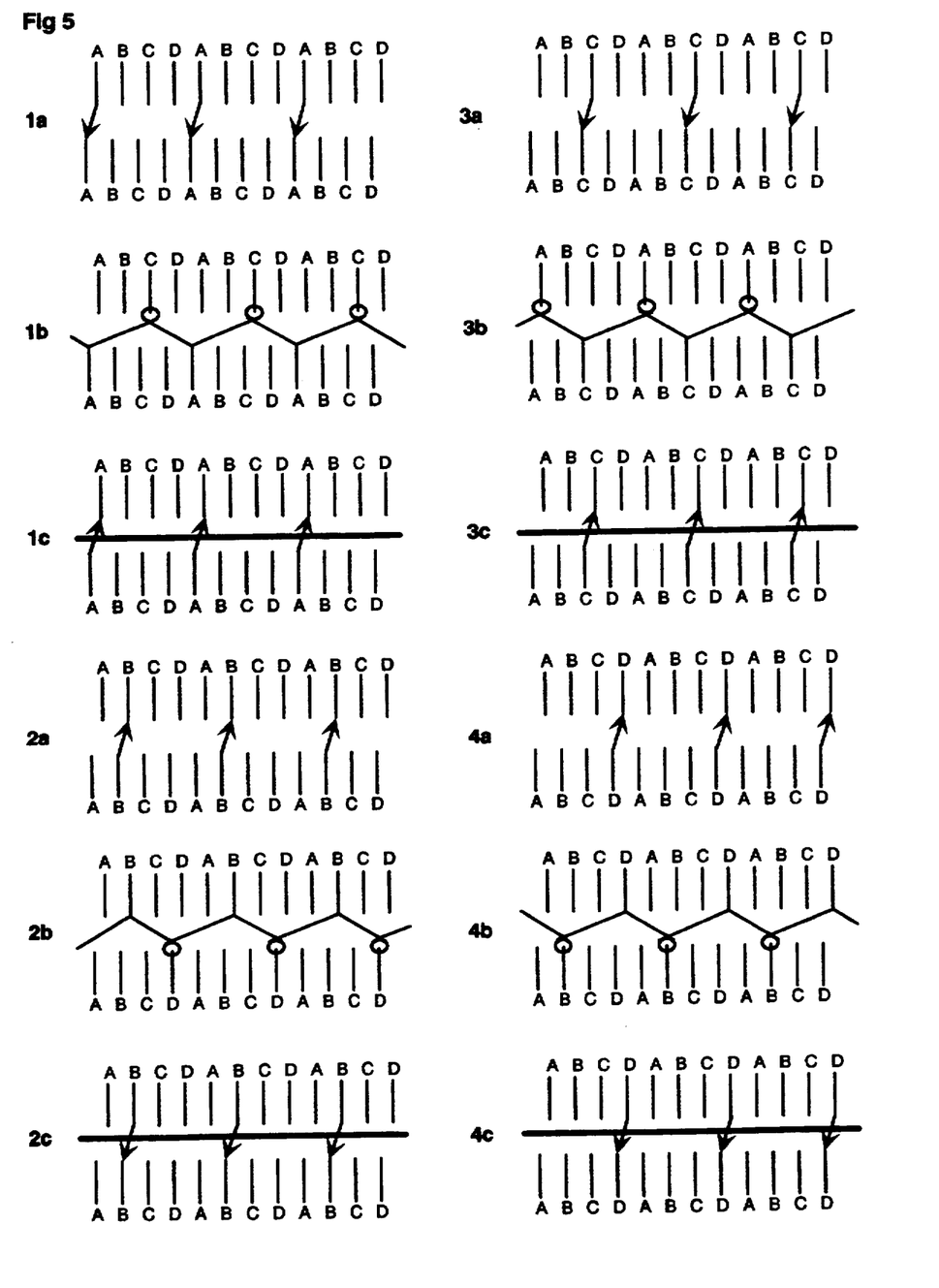
FIG. 5 is a thread progress diagram with loops and tuck loops, in which additional ribs or knobs are generated by means of the needle selection.

FIG. 5 shows how, in addition to the normal transfer tuck loop weft fabric (shown in diagram sections 1 to 4), a rib is worked in. Diagram sections 5, 6 and 7 show the covering with loops of selected needles in the rear needle bed, i.e. three successive threads are formed into loops. Diagram sections 8, 9 and 10 show the same operations in the front needle bed. The loops made by the steps shown in diagram sections 6 to 10 are slightly pulled together at the non-selected needles which remain in the loops, and ribs or knobs are formed. The steps of diagram sections 5 to 10 can be worked into the basic fabric as often as desired to form intermediate rows.

Figure 6:
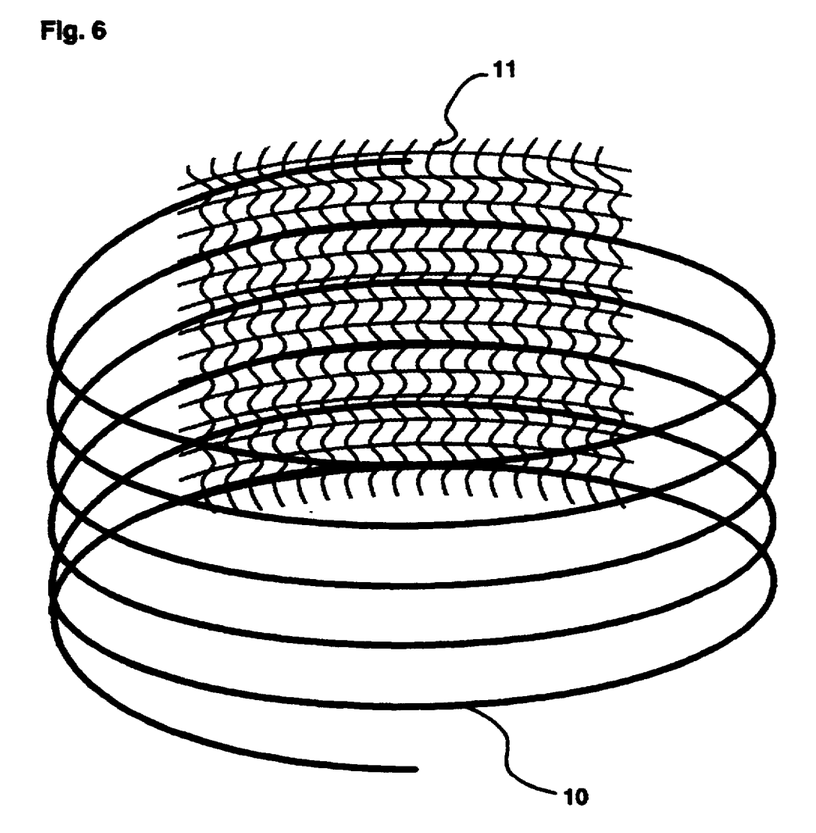
FIG. 6 is a schematic representation of a thread spiral worked into the knitted fabric.

FIG. 6 shows a schematic representation of the thread spiral 10, corresponding to the weft threads of FIGS. 1 to 5, worked into the fabric 11, which is preferably made from a single or a double thread and which is produced by means of the loop forming process described in connection with any one of FIGS. 1 to 5.

Figure 7:
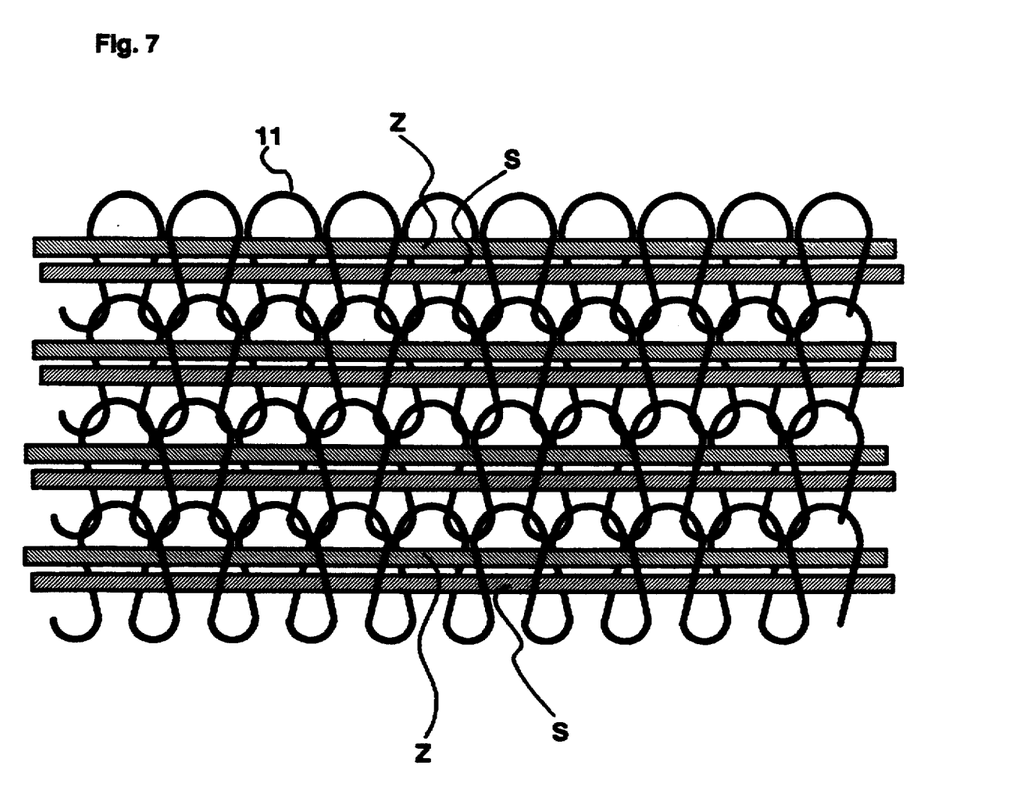
FIG. 7 is a pictorial view of a fabric produced in the manner illustrated in FIG. 1, having weft threads of different twist.

FIG. 7 illustrates the fabric produced by the operations shown in FIG. 1, wherein in this case two weft threads with different thread twists, S and Z, corresponding to thread 10 of FIG. 6, respectively, have been inserted.

All knitting processes have in common that it is possible to insert a pulling element in the form of a thread or wire into loops or tuck loops. In this case the pulling element is at least one spiral which, for example, can also have a thread twisted in the S-direction and another twisted in the Z-direction. These two threads are then lying parallel next to each other in the fabric.

The entire flat band can have a transverse connection by means of a binding agent, which increases the service life of the flat band. It is possible for this purpose to insert a temperature-resistant thread and at least one plastic thread with a low melting point into the fabric. For example, the spiral can also be prestressed, or a pulling element can have a highly elastic thread which still has an elasticity of more than 20% after the tubular fabric has been finished. For example, the highly elastic thread can have an elongation of more than 20%, and the loop thread can consist of a material with a lesser elasticity in comparison therewith. For reinforcement it is also possible to employ a metallic thread or wire as the pulling element. Basically, the ratio of the thread thickness of the pulling element to the thread thickness of the loop-forming carrier fabric is 1:1 to 10:1. The carrier fabric is constituted by the threads which form the loops.

The process has already been explained above by reference to thread progress diagrams. The tubular fabric is knitted on divided needles, the weft thread is inserted and subsequently the loop shank is transferred back on the binding needle. The divided loops are transferred after insertion of the weft thread. The needles are divided 1/1, and the tuck loops can be provided in the front and the loops in the back. In the process the weft thread is inserted without needle function, the loops are transferred from the back to the front and another 1/1 selection is made. At the end of this row the weft thread is inserted and transfer to the back is again performed. A plastic thread with a low melting point can be worked in as reinforcement and can be thermally or chemically converted to reinforce the tubular or knitted goods.

This application relates to subject matter disclosed in German Application number P 43 17 652.6, filed on May 27, 1993, the disclosure of which is incorporated herein by reference.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed:

1. An endless flat band for use as a transmission belt which has a direction of movement, said band comprising: a spirally placed, straight pulling element in the form of a thread or a wire extending in the direction of movement of the belt: and a transverse connection composed of a tubular fabric which has thread loops and at least partially of a binding agent, wherein at least one turn of the pulling element is inserted into the tubular fabric in a knitting machine, wherein the at least one turn of said pulling element is inserted already straightened into a right/right transfer construction between loops or loops and tuck loops.

2. An endless flat band in accordance with claim 1, wherein the at least one turn is inserted in a prestressed state.

3. An endless flat band in accordance with claim 1, wherein the pulling element comprises at least one thread twisted in the S-direction and at least one thread twisted in the Z-direction, said threads extending parallel to, and lying adjacent, one another in the fabric.

4. An endless flat band in accordance with claim 1, wherein the pulling element has at least one temperature-resistant thread and a least one plastic thread with a low melting point.

5. An endless flat band in accordance with claim 1, wherein the pulling element has a highly elastic thread which has an elasticity greater than 20% after the tubular fabric is finished.

6. An endless flat band in accordance with claim 1, wherein the pulling element comprises a highly elastic thread with an elongation greater than 20%, and that the thread loops consist of a material having a lower degree of elasticity than said elastic thread of said pulling element.

7. An endless flat band in accordance with claim 1, wherein the pulling element consists of a metallic thread.

8. An endless flat band in accordance with claim 1, wherein the pulling element consists of a wire.

9. An endless flat band in accordance with claim 1, wherein the pulling element thread or wire has a thickness, the tubular fabric is composed of threads having a thickness and the ratio of the thread thickness of the pulling element to the thread thickness of the tubular fabric threads is between 1:1 and 10:1.

10. A process for manufacturing an endless flat band as defined in claim 1, in a knitting machine having divided needles comprising: knitting the tubular fabric on the divided needles, inserting the pulling element as a weft thread during knitting, and transferring loop threads back to a binding needle.

11. A process in accordance with claim 10, wherein the loop threads are transferred following the insertion of the weft thread.

12. A process in accordance with claim 10, wherein: the knitting machine includes a front needle bed and a rear needle bed, each needle bed having needles; the needles are divided 1/1; tuck loops are provided at the front needle bed and loops are provided at the rear needle bed; the weft thread is inserted without needle function; and the loops are transferred from the rear needle bed to the front needle bed, another selection 1/1 is made and the weft thread is inserted again and transfer to the rear needle bed is again performed.

* * * * *